United States Patent [19]

Jennings et al.

[11] Patent Number: 4,553,589

[45] Date of Patent: Nov. 19, 1985

[54] FIRE-SAFE SURFACE-CONTROLLED SUBSURFACE SAFETY VALVE CONTROL LINE/WELLHEAD CONNECTOR AND BLOWOUT PREVENTER

[75] Inventors: Charles E. Jennings; Charles D. Bridges; Warren D. King, all of Houston, Tex.

[73] Assignee: Gray Tool Company, Houston, Tex.

[21] Appl. No.: 630,122

[22] Filed: Jul. 12, 1984

[51] Int. Cl.[4] .................. E21B 34/10; E21B 34/16
[52] U.S. Cl. .................................. 166/53; 137/72; 166/317; 166/363; 166/75.1
[58] Field of Search .............. 166/75 R, 53, 364, 64, 166/67, 316, 317, 319, 321, 363; 137/72, 73, 75; 169/69, 48, 56

[56] References Cited

U.S. PATENT DOCUMENTS 3,618,627 11/1971 Wagner ........................ 137/72 X
3,659,624 5/1972 Kelly et al. .................. 137/72 X
4,422,503 12/1983 Goans ........................... 137/75 X

FOREIGN PATENT DOCUMENTS 313991 6/1972 U.S.S.R. ............................ 137/72

Primary Examiner—Stephen J. Novosad
Attorney, Agent, or Firm—Arthur L. Wade; Troxell K. Snyder

[57] ABSTRACT

The existance of fire at or near an oil field wellhead is sensed by a eutectic body which holds a valve system in a cocked position. When the eutectic is melted, the valves are positioned to terminate communication of a hydraulic fluid pressure source with a downhole safety valve and open a bleed conduit connected with the conduit to the downhole valve. A second eutectic body will melt at a different temperature than the first, providing a second position for the valve system which closes the conduit to the downhole valve and atmosphere to give positive isolation from the oil well fluid.

2 Claims, 4 Drawing Figures 4,553,589

FIRE-SAFE SURFACE-CONTROLLED SUBSURFACE SAFETY VALVE CONTROL LINE/WELLHEAD CONNECTOR AND BLOWOUT PREVENTER

TECHNICAL FIELD

The present invention relates to means for controlling fire at or near the wellhead of an oil well. More particularly, the invention relates to temperature-responsive mechanism at the wellhead to terminate communication between a source of high pressure fluid and a downhole safety valve.

BACKGROUND ART

A downhole safety valve is placed at a predetermined distance below the surface of an oil well. Should a fire break out at or near the wellhead, the downhole valve is closed by terminating the fluid pressure to the downhole valve, the valve being located in the production tubing.

To impose the required hydraulic fluid pressure on the downhole valve, a stainless steel tubing, about ¼" in diameter, is extended from the source of the hydraulic fluid pressure to the valve. There are various obstructions to the flow of hydraulic fluid from the source. The wellhead structure must be penetrated and the source of fluid is linked with the ¼" stainless steel tubing as it extends down to the downhole valve.

Once the conduit or path for the hydraulic fluid is extended through the wellhead structure, there is no provision available for controlling the fluid pressure extending to the downhole valve. Therefore, there is a need in this art for a simple, effective temperature-responsive structure which will carry out a program to control communication between the source of the hydraulic fluid pressure and the ¼" stainless steel tubing whose upper end is communicated with the conduit penetrating the wellhead structure. When released from this pressure, the downhole valve closes. When the valve is closed, fuel to the fire at the wellhead is deprived of the inflammable production which would sustain or enlarge the fire.

DISCLOSURE OF THE INVENTION

The present invention contemplates controlling a downhole valve installed in production tubing at a predetermined distance from the surface. This subsurface safety valve normally receives a hydraulic fluid with a pressure value which will maintain the valve in an open position.

The invention further contemplates a eutectic slug mounted as an abutment at one end of a control piston to resist the system hydraulic pressure and the spring force applied to poppet valves and maintain the valves open. While in this cocked position, if a fire reaches a predetermined temperature, the eutectic will melt, allowing the system hydraulic force to move the control piston and isolate the hydraulic fluid pressure from its source to the subsurface safety valve. At the same time, pressure in the control line is vented to the atmosphere. When a predetermined higher temperature of the fire is reached, a second eutectic slug melts and allows the control piston to continue its motion under spring force to close the control line so as to prevent production fluid from the control line feeding the fire, should the seals on the subsurface valve fail.

Other objects, advantages and features of this invention will become apparent to one skilled in the art upon consideration of the written specification, appended claims, and attached drawings.

BRIEF DESIGNATION OF THE DRAWINGS

Figure 2:
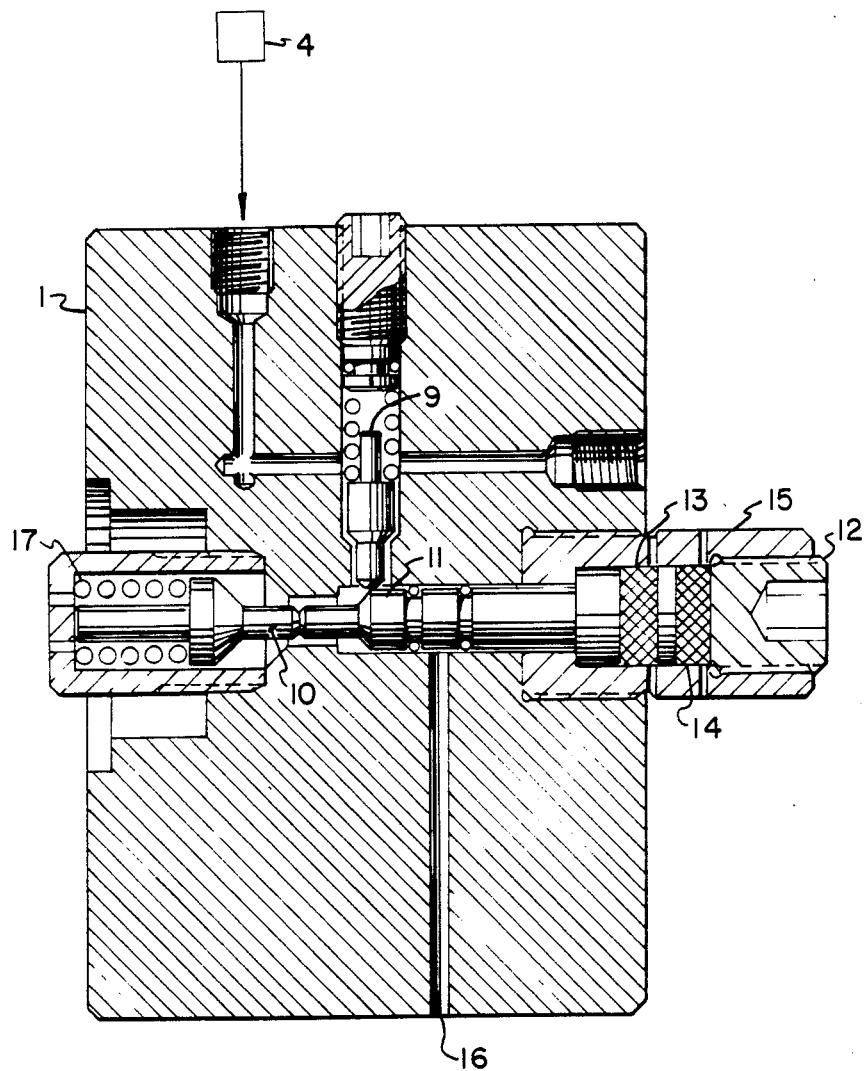
FIG. 2 is an enlarged diagrammatic elevation of the safety system of FIG. 1 when the well is producing normally.
Figure 3:
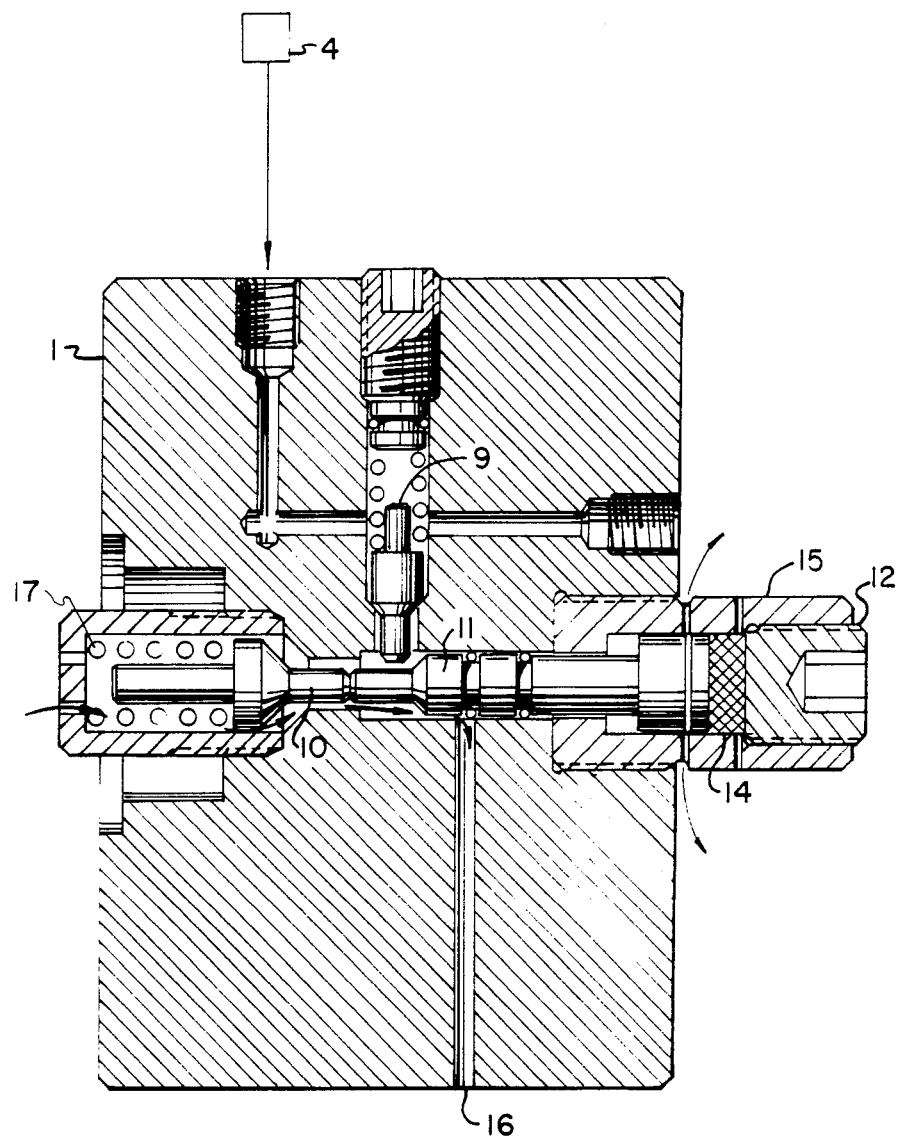
Figure 4:
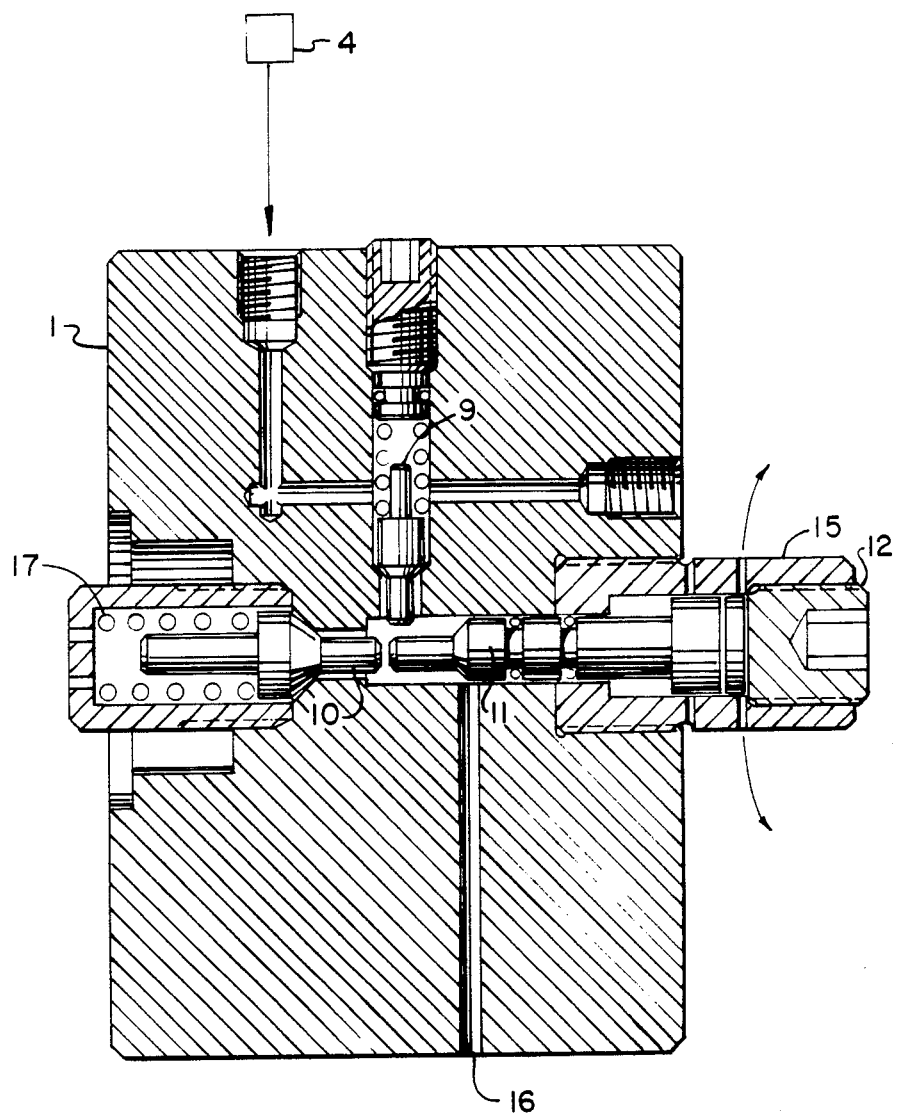

FIG. 3 discloses the structure of FIG. 2 in the position to which it moves after the first eutectic is melted; and FIG. 4 is the structure of FIG. 2 in the position following the melting of both eutectic bodies.

BEST MODE FOR CARRYING OUT THE INVENTION

Four figures are offered to aid understanding the position and function of the structure which embodies the present invention. FIG. 2 discloses the structure in the position which applies the source of hydraulic pressure to the downhole valve. Two eutectic bodies maintain the structure in the position of FIG. 2 when normal operation of the well is taking place. In short, the downhole valve is held open by the hydraulic fluid pressure so that production can be flowed up the tubing and recovered above ground. Assuming a fire breaks out at the surface at or in the vicinity of the wellhead, the first predetermined temperature of the fire melts one of the eutectics and thus the structure assumes the position disclosed in FIG. 3. FIG. 4 discloses the position of the structure after the second eutectic melts.

Figure 1:
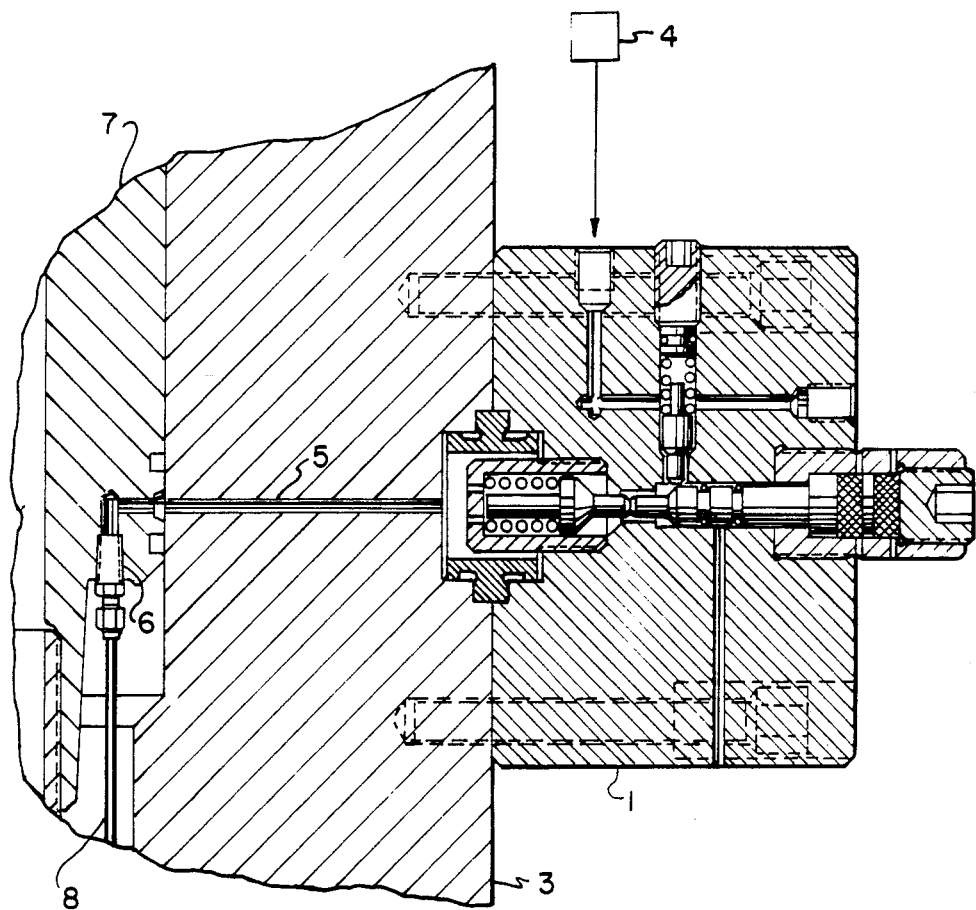
FIG. 1 is a sectioned elevation showing a fire safety system embodying the invention mounted on the wellhead structure of an oil well.

Referring more specifically to FIG. 1, housing 1 for the invention is disclosed as mounted on the exterior of tubing head 3. Hydraulic fluid pressure from a source 4 is transmitted through housing 1, through a port 5 in the tubing head, a connection 6 in tubing hanger 7, and downward through a control line 8 to the downhole safety valve, not shown. Of course, it is the basic objective of the embodiment of the present invention to control the communication of the hydraulic fluid pressure from source 4 to the downhole safety valve. Again, in sequence, the hydraulic fluid pressure is transmitted through housing 1, to control transmission of the power fluid as it is directed through penetrations in the wellhead structure to reach downhole control line 8. Control line 8 connects the hydraulic fluid pressure to the predetermined depth of the safety control valve and holds the control valve open against a spring. A fire at the wellhead terminates this communication of the hydraulic fluid by the mechanism within housing 1.

Referring to FIG. 2, the present embodiment of the invention is mounted within housing 1. The source 4 of high pressure fluid is connected to the downhole safety valve. This connection of source 4 is maintained by the open position of poppet valves 9 and 10. When valve 9 is closed, the hydraulic fluid pressure is isolated from the downhole valve and the valve closes. Both poppet valves 9 and 10 are held in their open positions by engagement with a control piston 11. Control piston 11 is maintained in the FIG. 2 position by the force of plug 12 against eutectics 13 and 14 and large end of piston 11, all contained in a holder 15.

When eutectic slug 13 is melted by a predetermined temperature, the control piston 11 is moved axially under the influence of source pressure. The result of this movement of the piston is the closure of poppet valve 9 which, of course, isolates the source of pressure which kept the downhole valve open. At the same time, the movement of control piston 11 bleeds the control line to the subsurface valve to atmosphere through a vent line 16. The result is that the well production is terminated at the downhole valve, safely located in the production tubing a predetermined distance below the wellhead. This is the position of valves 9 and 10 disclosed in FIG. 3.

Turning from the FIG. 3 disclosure of control piston 11 controlled by eutectic slug 14 on one end and spring 17 on the other end, FIG. 4 discloses the position of the piston when the temperature from the fire causes the second eutectic slug 14 to melt. When slug 14 melts at a predetermined temperature, control piston 11 is released to continue its axial movement. This second position of piston 11 allows poppet valve 10 to close and prevent the escape of inflammable fluid through the control line and thereby blocks all possibility of flowing production fluid to the fire at the wellhead, should the seals fail on the downhole valve.

Holder 15 is observed as a unit containing control piston 11, plug 12 and eutectics 13 and 14 and may be removed for inspection, removal and replacement of the piston assembly. If it is desired to simply test the operability of the subassembly, plug 12 may be unscrewed from the end of holder 15 with a wrench. Removal of the plug is equivalent to melting the eutectics. In other words, by removing plug 12, the control piston will move a distance equal to the eutectics melting by fire.

CONCLUSION

The present invention is responsive to the heat of a fire which threatens the oil well. A downhole valve is located in the production tubing and has a spring which urges the valve shut against the force of a hydraulic fluid pressure. The basic function of the apparatus which embodies the invention is responding to the heat at two different values. In a normal position, the structure of the embodiment controls the hydraulic fluid pressure at the surface. This fluid pressure is conducted by a conduit to the downhole valve in order to keep the valve open for continuous production.

The structure embodying the invention responds to the heat of the fire by eutectic bodies melting at predetermined temperatures. As the first eutectic melts and is removed as an abutment, a control piston is moved under system pressure. The piston mechanically holds poppet valve 10 open while allowing poppet valve 4 to close, thereby shutting off the hydraulic fluid pressure which holds the downhole valve open. As poppet valve 9 closes, the control line to the downhole valve is opened to atmospheric pressure, allowing the pressure on the downhole valve to bleed down and close the downhole valve. Thus, we have the fire terminating the connection of the source of fluid pressure to the downhole valve and at the same time, venting the fluid pressure captured in the control line.

When a second eutectic body melts at a predetermined temperature and is removed, the piston moves further to close poppet valve 10 on the downhole control line. Should the seal of the downhole valve fail, all escape to the atmosphere is prevented.

From the foregoing, it will be seen that this invention is one well adapted to attain all the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. A system mounted on or near an oil well to respond to temperatures of a fire to prevent oil well production from reaching the fire at the wellhead, including,
    a source of hydraulic fluid pressure connected by a control conduit to a downhole safety valve to maintain the valve open against its spring force,
    a first valve of the system connected to control the conduit between the source and the downhole valve,
    a second valve of the system connected to control the bleed of the conduit between the source and the downhole valve,
    a control piston contacting the first and second valves of the system,
    and at least one eutectic body against which the control piston abuts from the force of a spring of the second valve,
    whereby removal of the eutectic body by a predetermined temperature of a fire releases the piston and allows the system pressure to move the piston and thereby close the first valve to isolate the source of fluid pressure to the downhole safety valve and establishes a bleed of the control conduit.

2. The system of claim 1, wherein,
    a second eutectic is provided as an abutment for the control piston which eutectic melts at a predetermined temperature higher than that of the first eutectic.
    whereby the control piston is moved by the force of a spring of the second valve to close the bleed.

* * * * *